United States Patent [19]
Toulier

[11] 3,820,406
[45] June 28, 1974

[54] STARTER DRIVE FOR INTERNAL COMBUSTION ENGINES

[75] Inventor: Pierre Toulier, Ville D'Avray, France

[73] Assignee: Societe Anonyme D.B.A., Clichy, France

[22] Filed: Dec. 20, 1972

[21] Appl. No.: 316,790

[30] Foreign Application Priority Data
Dec. 29, 1971   France .............................. 71.47230

[52] U.S. Cl. ........................................ 74/6, 192/42
[51] Int. Cl. ............................................. F02n 15/00
[58] Field of Search .............. 192/42, 45; 74/6, 7 R, 74/7 A

[56] References Cited
UNITED STATES PATENTS
| | | | |
|---|---|---|---|
| 2,664,183 | 12/1953 | Payne .................................. | 192/45 |
| 3,140,617 | 7/1964 | Palmer ................................... | 74/6 |

*Primary Examiner*—Samuel Scott
*Assistant Examiner*—Frank H. McKenzie, Jr.
*Attorney, Agent, or Firm*—William S. Thompson

[57] ABSTRACT

A starter drive for an internal combustion engine, in which an overrunning clutch comprises an annular driving member capable of being driven by a starting motor, this member being concentric with and around a driven member attached to a pinion capable of drivingly engaging an engine which is to be started, the clutch further comprising a series of rollers housed in recesses formed in the driven member, each roller bearing both on a cylindrical surface of the driven member and on a cam surface in the bottom of one of said recesses, and each roller being biased by a spring wedging mechanism. In this starter, the wedging mechanism comprises two or more springs arranged in parallel between the roller and one wall of the recess, these springs being coil springs having circular turns and forming a group of thrust members substantially equispaced over the length of the roller. The thrust thus exerted on the roller is more evenly distributed than by means of known wedging mechanisms which include a single spring having a rectangular cross-section.

1 Claim, 4 Drawing Figures

PATENTED JUN 28 1974    3,820,406

STARTER DRIVE FOR INTERNAL COMBUSTION ENGINES

The invention relates to improvements to starter drives for internal combustion engines, more particularly to a starter drive of the positive shift type having a roller overrunning clutch structure.

In starter drives of this type the overunning clutch comprises an annular driving member capable of being driven by a starting motor, this member being concentric with and around a driven member connected to a pinion drivingly engageable with the shaft of the engine which is to be started, the clutch further comprising a series of rollers housed in recesses formed in the driving member, each roller bearing both on a cylindrical bearing surface of the driven member and on the cam forming bottom of one of the recesses. Also, each roller is biased by a wedging mechanism comprising spring means.

In the known arrangement the wedging mechanism uses a spring whose turns are substantially rectangular in shape. Under these conditions the thrust exerted on a roller by a spring is preponderantly applied at a point which corresponds to the junction between the end effective turn and the neutral turn, the thrust at the other point of contact between the spring and roller being chiefly determined by the flexibility of the neutral turn relative to the point at which it is joined to the last effective turn. The imbalance resulting from the — sometimes considerable — difference between these two thrusts means that, when the overrunning clutch is wedged in the driving direction, engagement occurs chiefly at one end of each roller while the other end, on which insufficient thrust is exerted, tends to escape engagement. Since the overloading of one end of a roller may force the roller to escape from positive engagement with the two surfaces on which it bears, the known arrangement may cause the clutch to slip. It is apparent that any cause of slipping must be avoided, seeing that the bearing surfaces sometimes acquire a glass-smooth finish due to the engine vibration, which, with the efficiency of the lubricant, drastically reduces the friction coefficient essential to ensure a wedging engagement of the rollers.

An object of the invention is to provide a starter drive which is not subject to the risk of slipping described above.

In the starter drive according to the invention the wedging mechanism for each roller comprises at least two springs arranged in parallel between the roller and one wall of the recess containing the roller, these springs being coil springs with circular turns and forming a group of thrust members substantially equispaced over the length of the roller.

The invention will now be described by way of example with reference to the accompanying drawings in which.

Figure 1:
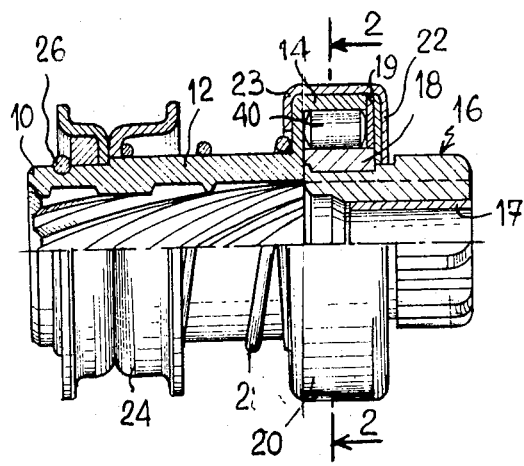
FIG. 1 is an elevational view partly in cross-section of an starter drive embodying the invention.
Figure 2:
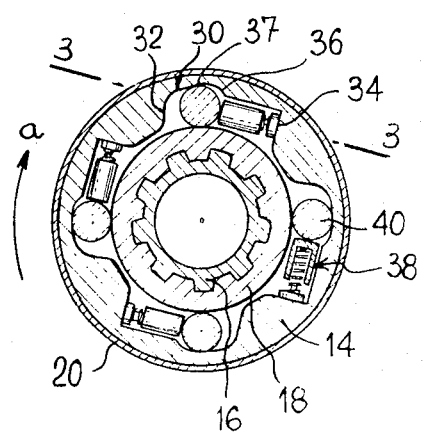
FIG. 2 is a cross-sectional view along a line 2—2 in FIG. 1, showing the structure of the overrunning clutch.

The starter drive illustrated in FIGS. 1 and 2 is to be mounted on the shaft output of a starting motor (not shown). It has a driving portion formed by a sleeve 10, whose inside surface contains long pitch helical grooves 12 cooperating with corresponding grooves on the starter shaft, and by the driving member 14 of the overrunning clutch. A driven portion comprises a pinion 16 which is connected to the driven member 18 of the clutch. A bearing 17 is fitted within an axial bore of the pinion 16, and this pinion is designed to rotate freely on the end of the starting motor shaft, this end having a reduced diameter. The driving member 14 and driven member 18 are concentric and are held in place by discs 19 and by a casing 20, whose flanged sides 22, 23 hold the driven member 18 axially fixed while permitting its rotation.

The sleeve 10 carries slidable operating collar 24, stopped on the left by a split ring 26, and operated by a control fork (not shown). A spring 28 surrounds the sleeve 10 between the collar and the clutch.

The driving member 14 and driven member 18 are concentric annular members, the driven member being in the inner position and having a cylindrical outer surface. The inner surface of the driving member 14 contains a plurality of circularly arranged recesses 30 defined by two side walls 32, 34 and by a bottom 36. The bottom portion adjacent to the wall 32 forms a cam surface 37 with eccentric curvature.

Each recess 30 in the driving member contains a roller 40. Each roller is biased by a wedging mechanism 38 which bears on the wall 34 of the recess and tends to drive the roller between the cam surface 37 of the recess and the cylindrical surface of the driven member 18.

The starter drive described above operates as follows. Actuation of the control fork acting on the starter drive through the control collar 24 and through the srping 28 causes the starter drive to move to the right (in FIG. 1), so that the driving pinion 16 meshes with the flywheel (not shown) of the engine which is to be started. If meshing cannot take place (teeth in abutment), the fork continues to urge the control collar 24 to the right, compressing the spring 28, until the starting motor begins to rotate, energization of this motor occuring in response to a pre-determined amount of movement of the fork. As soon as rotation begins the pinion and flywheel mesh, due to the combined action of the compressed spring and of the screwthread on the sleeve 10, which converts some of the initial rotation into an axial movement towards the right.

As soon as meshing is complete, the inertia of the engine temporarily prevents the pinion 16 and therefore the member 18 of the clutch mechanism from rotating, whereas the driving member 14 is driven by the starting motor in the direction of an arrow *a* (FIG. 2). The rollers 40 are therefore wedged hard between the cam surface 37 and the driven member 18 attached to the pinion, which is then driven by the starting motor.

After the engine has been started the pinion 16 is driven faster than the starting motor. Relative reverse motion of the former results and tends to move the rollers 40 back in the direction of the arrow *a*, in spite of the pressure from the springs of the wedging mechanism 38. Consequently, since the members 14 and 18 are no longer interconnected, the starting motor is no longer driven by the engine, although the pinion 16 continues to mesch with the flywheel until the fork is returned to its idle position.

Figure 3:
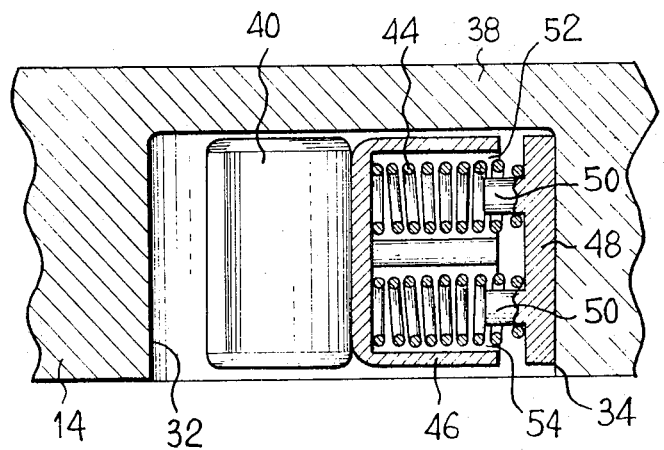
FIG. 3 is cross-sectional view along a line 3—3 in FIG. 2, showing the mechanism for wedging the rollers.

In accordance with the invention the wedging mechanism 38, which is shown on a larger scale in FIG. 3, comprises two compression springs 44, a guide 46 and a base plate 48.

The springs 44 are coil springs with circular turns and are disposed side by side along the length of the roller 40. By way of the guide 46 and base plate 48, the springs 44 exert a thrust evenly distributed over a generatrix of the roller 40, even if the latter tends to move askew due to imperfections in the surfacess with which it is in contact. This result could not be obtained by means of the known arrangements, in which the thrust was applied by a compression spring with rectangular turns and varied along the length of the roller, seeing that the thrust applied by a spring having rectangular convolutions is a function of the flexibility of the neutral turn relative to the point at which it is joined to the last effective turn. Also, it should be noted that springs with circular turns are easier to make than springs with rectangular turns.

The springs 44 could be placed directly between the roller 40 and the recess wall 34, without using the guiding arrangement including of the guide 46 and the base plate 48. This guiding arrangement is advantageous, however, since it enables the wedging mechanism 38 to withstand vibrations.

Figure 4:
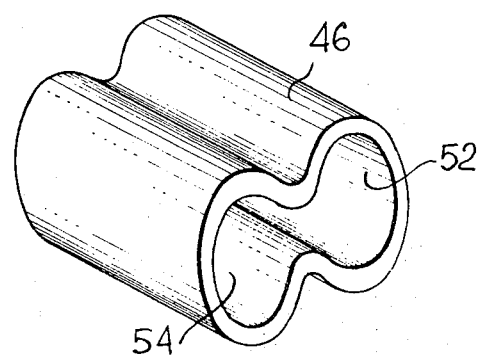
FIG. 4 is a perspective view of a guide for use in the mechanism shown in FIG. 3.

In the embodiment shown in the figures, the base plate 48 carries two studs 50 on its face remote from the face bearing on the recess wall 34. The studs 50, each of which receives a spring 44, keep the springs a constant distance apart. The guide 46 is a hollow member, closed at one end and formed of two mutually adjacent passages 52, 54 with circular cross-sections, each passage housing one spring 44. The closed end of the guide has a substantially tangential engagement with the surface of the roller 40, and the open end of the guide faces the base plate 48. In the embodiment, of which FIG. 4 is a perspective view, the guide is formed of a tube which is axially deformed to have a cross-section in the shape of a figure 8 having a gap at the center thereof, so as to define the two passages 52, 54 without providing a partition wall where they join.

The diameter of the compression springs 44 is selected so that, allowing for the space taken up by the guide 46, the springs are readily accommodated within the depth of the recess 30, and also occupy pratically the entire length of the roller when arranged in parallel. In the embodiment described the wedging mechanism has two compression springs, but it may be necessary to use a larger number of springs if the ratio between the length and the diameter of the roller is large. An advantageous detail is that the open end of the guide 46 continues to be spaced relative to the base plate 48 even when the roller 40 is brought as far as possible to the right, into the position in which it exerts the strongest pressure on the wedging mechanism.

What is claimed is:

1. A starter drive for an internal combustion engine, in which an overrunning clutch comprises an annular driving member capable of being driven by a starting motor, this member being concentric with and around a driven member attached to a pinion capable of drivingly engaging an engine which is to be started, the clutch further comprising a series of rollers housed in recesses formed in the driven member, each roller bearing both on a cylindrical surface of the driven member and on a cam surface in the bottom of one of said recesses, and each roller being biased by a spring wedging mechanism, the starter drive being characterized in that each wedging mechanism comprises at least two springs arranged in parallel between the roller and one wall of the recess, these springs being coil springs having circular turns and forming a group of thrust members substantially equispaced over the length of the roller, and a guide formed by a hollow member having a closed end in contact with the roller and having parallel passages in which the springs are housed.

* * * * *